United States Patent
Asako et al.

(10) Patent No.: US 9,735,420 B2
(45) Date of Patent: Aug. 15, 2017

(54) POSITIVE ELECTRODE FOR LITHIUM ION SECONDARY BATTERIES AND LITHIUM ION SECONDARY BATTERY INCLUDING THE SAME

(71) Applicant: Sharp Kabushiki Kaisha, Osaka (JP)

(72) Inventors: Isao Asako, Osaka (JP); Naoto Nishimura, Osaka (JP); Tomohisa Yoshie, Osaka (JP); Takahiro Matsuyama, Osaka (JP); Shougo Esaki, Osaka (JP); Shumpei Nishinaka, Osaka (JP); Yuichi Kamimura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 157 days.

(21) Appl. No.: 14/782,492

(22) PCT Filed: Apr. 23, 2014

(86) PCT No.: PCT/JP2014/061474
§ 371 (c)(1),
(2) Date: Oct. 5, 2015

(87) PCT Pub. No.: WO2014/175352
PCT Pub. Date: Oct. 30, 2014

(65) Prior Publication Data
US 2016/0056453 A1    Feb. 25, 2016

(30) Foreign Application Priority Data

Apr. 26, 2013    (JP) .................................. 2013-094454

(51) Int. Cl.
*H01M 4/136* (2010.01)
*H01M 4/52* (2010.01)
(Continued)

(52) U.S. Cl.
CPC ............ *H01M 4/136* (2013.01); *H01M 4/52* (2013.01); *H01M 4/525* (2013.01);
(Continued)

(58) Field of Classification Search
None
See application file for complete search history.

(56) References Cited

U.S. PATENT DOCUMENTS 8,900,773 B2 *  12/2014  Vincent ............... H01M 4/8605
                                                    427/115
9,356,271 B2 *   5/2016  Ramasubramanian . H01M 2/16
(Continued)

FOREIGN PATENT DOCUMENTS

CA      2 873 820 A1    11/2010
CN      102439767 A      5/2012
(Continued)

OTHER PUBLICATIONS

International Search Report for corresponding International Application No. PCT/JP2014/061474 mailed Jun. 17, 2014.
(Continued)

*Primary Examiner* — Scott J Chmielecki
(74) *Attorney, Agent, or Firm* — Renner, Otto, Boisselle & Sklar, LLP

(57) ABSTRACT

A positive electrode for lithium ion secondary batteries includes a collector and a positive electrode active material layer formed on at least one surface of the collector. The positive electrode active material layer contains a lithium-containing metal oxide having a unit cell represented by the following formula and a conductive material and has voids with a volume of $0.82 \times 10^{-3}$ cm$^3$/cm$^2$ to $7.87 \times 10^{-3}$ cm$^3$/cm$^2$ per unit area of the collector:

$$LiFe_{1-x}Zr_xP_{1-y}Si_yO_4 \qquad (1)$$

(Continued)

where $0<x<1$ and $0<y<1$. The unit cell has lattice constants satisfying $10.326 \leq a \leq 10.335$, $6.006 \leq b \leq 6.012$, and $4.685 \leq c \leq 4.714$. The sum of the volume of the lithium-containing metal oxide and the volume of the conductive material is $1.61 \times 10^{-3}$ cm$^3$/cm$^2$ to $6.46 \times 10^{-3}$ cm$^3$/cm$^2$ per unit area of the collector.

9 Claims, 1 Drawing Sheet

(51) Int. Cl.
- H01M 4/525 (2010.01)
- H01M 4/58 (2010.01)
- H01M 4/62 (2006.01)
- H01M 10/0525 (2010.01)
- H01M 4/02 (2006.01)

(52) U.S. Cl.
CPC ......... *H01M 4/5825* (2013.01); *H01M 4/622* (2013.01); *H01M 4/625* (2013.01); *H01M 10/0525* (2013.01); H01M 2004/021 (2013.01); H01M 2004/028 (2013.01); Y02T 10/7011 (2013.01)

(56) References Cited

U.S. PATENT DOCUMENTS

| | | | |
|---|---|---|---|
| 2008/0160407 A1 | 7/2008 | Ishii et al. | |
| 2009/0104517 A1* | 4/2009 | Yuasa | H01M 4/505 429/158 |
| 2012/0003537 A1* | 1/2012 | Ohira | H01B 1/08 429/219 |
| 2012/0070708 A1 | 3/2012 | Ohira et al. | |
| 2012/0244443 A1 | 9/2012 | Ohira et al. | |
| 2012/0258369 A1* | 10/2012 | Yokoyama | H01M 4/02 429/231.1 |
| 2012/0288763 A1 | 11/2012 | Ohira et al. | |
| 2013/0330623 A1 | 12/2013 | Matsushita et al. | |
| 2014/0011083 A1 | 1/2014 | Asako et al. | |
| 2014/0030595 A1* | 1/2014 | Kishimi | H01M 2/1673 429/218.1 |

FOREIGN PATENT DOCUMENTS

| | | |
|---|---|---|
| CN | 102694170 A | 9/2012 |
| CN | 102779996 A | 11/2012 |
| JP | 2008-166207 | 7/2008 |
| JP | 2011/249228 A | 12/2011 |
| JP | 2014-010977 A | 1/2014 |
| JP | 2014-013748 | 1/2014 |
| WO | WO 2014/010526 A1 | 1/2014 |

OTHER PUBLICATIONS

Form PCT/ISA/237 for corresponding International Application No. PCT/JP2014/061474 dated Jun. 17, 2014.

* cited by examiner

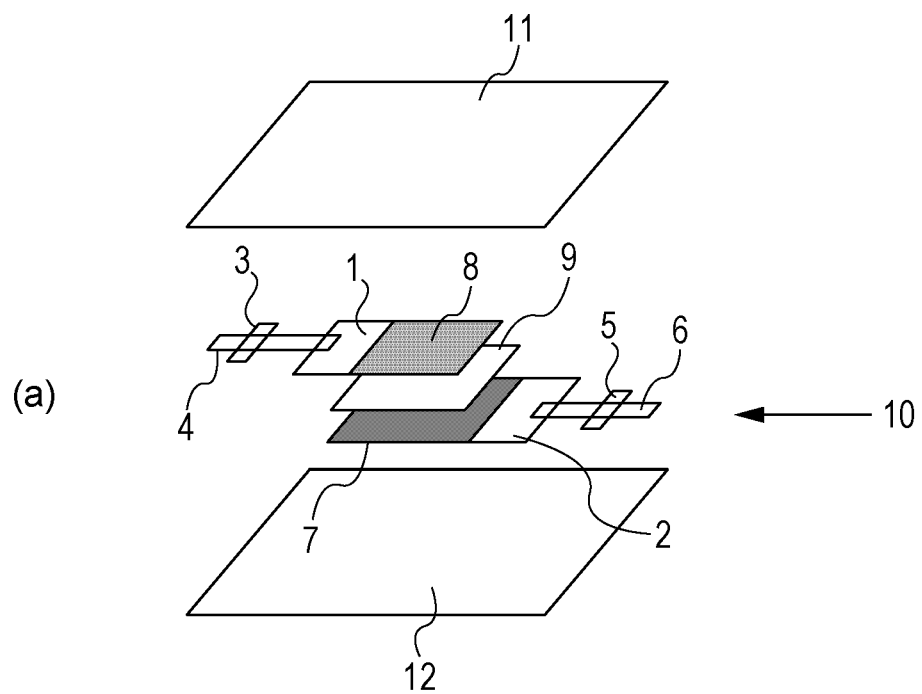
(a)
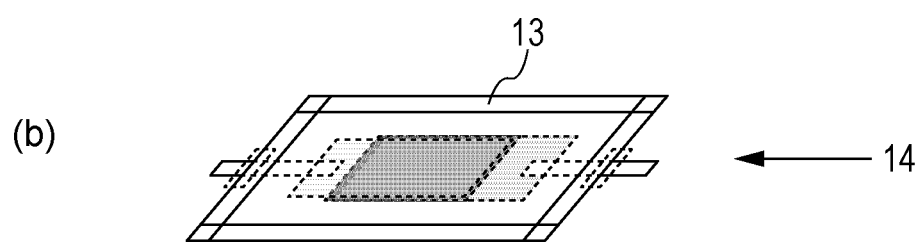
(b)

POSITIVE ELECTRODE FOR LITHIUM ION SECONDARY BATTERIES AND LITHIUM ION SECONDARY BATTERY INCLUDING THE SAME

TECHNICAL FIELD

The present invention relates to positive electrodes for lithium ion secondary batteries and lithium ion secondary batteries including the same. The present invention particularly relates to a positive electrode, having excellent cycle characteristics, for lithium ion secondary batteries and a lithium ion secondary battery including the same.

BACKGROUND ART

Lithium ion secondary batteries are attracting much attention as not only compact devices for portable electronics but also high-capacity devices for on-vehicle applications and power storage. Therefore, requirements such as safety, cost, and life are increasingly being raised.

A lithium ion secondary battery includes a positive electrode, a negative electrode, an electrolyte solution, a separator, and an enclosure as main components. The positive electrode is composed of a positive electrode active material, a conductive material, a collector, and a binder (binding agent).

In general, a layered transition metal oxide typified by $LiCoO_2$ is used as a positive electrode active material. However, the layered transition metal oxide is likely to release oxygen at a relatively low temperature of about 150° C. in a fully charged state and the thermal runaway reaction of a battery may possibly be caused by the release of oxygen. Thus, in the case of using a battery containing such a positive electrode active material in a portable electronic device, accidents such as the heat generation and ignition of the battery may possibly occur.

Therefore, olivine-structured iron lithium phosphate ($LiFePO_4$) and derivatives thereof are expected because olivine-structured iron lithium phosphate has a stable structure, does not release oxygen under abnormal conditions, and is more inexpensive than $LiCoO_2$. Japanese Unexamined Patent Application Publication No. 2008-166207 (Patent Literature 1) reports $LiFe_{1-x}Zr_xP_{1-y}Si_yO_4$ in which an Fe site and a P site are substituted with Zr and Si, respectively, as an iron lithium phosphate derivative.

CITATION LIST

Patent Literature

PTL 1: Japanese Unexamined Patent Application Publication No. 2008-166207

SUMMARY OF INVENTION

Technical Problem

The iron lithium phosphate derivative described in the above publication is substituted with Zr and Si and therefore is expected to enhance cycle characteristics. However, there is room for improvement in the enhancement thereof.

Solution to Problem

As a result of investigations, the inventors have found that a positive electrode for lithium secondary batteries having enhanced cycle characteristics can be provided when (i) lattice constants a, b, and c of the unit cell of a lithium-containing metal oxide used as a positive electrode active material are within a specific range, (ii) the voidage of a positive electrode active material layer is within a specific range, and (iii) the sum of the volume of the lithium-containing metal oxide and the volume of a conductive material is within a specific range. This has led to the completion of the present invention.

The present invention provides a positive electrode for lithium ion secondary batteries. The positive electrode includes a collector and a positive electrode active material layer formed on at least one surface of the collector. The positive electrode active material layer contains a lithium-containing metal oxide having a unit cell represented by the following formula and a conductive material and has voids with a volume of $0.82\times10^{-3}$ $cm^3/cm^2$ to $7.87\times10^{-3}$ $cm^3/cm^2$ per unit area of the collector:

$$LiFe_{1-x}Zr_xP_{1-y}Si_yO_4 \qquad (1)$$

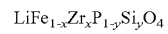

where $0<x<1$ and $0<y<1$. The unit cell has lattice constants satisfying $10.326 \leq a \leq 10.335$, $6.006 \leq b \leq 6.012$, and $4.685 \leq c \leq 4.714$. The sum of the volume of the lithium-containing metal oxide and the volume of the conductive material is $1.61\times10^{-3}$ $cm^3/cm^2$ to $6.46\times10^{-3}$ $cm^3/cm^2$ per unit area of the collector.

Furthermore, the present invention provides a lithium ion secondary battery including the above positive electrode, a negative electrode, a separator located between the positive electrode and the negative electrode.

Advantageous Effects of Invention

The present invention can provide a positive electrode capable of enhancing cycle characteristics of lithium ion secondary batteries and a lithium ion secondary battery having enhanced cycle characteristics.

Furthermore, the present invention can provide a positive electrode capable of further enhancing cycle characteristics of lithium ion secondary batteries and a lithium ion secondary battery having further enhanced cycle characteristics when any one of the following requirements is satisfied:

(1) a positive electrode active material layer has voids with a volume fraction of 30% to 52%;
(2) the volume of a lithium-containing metal oxide and the volume of a conductive material have a ratio of 1:0.06 to 1:0.23;
(3) the sum of the volume of the lithium-containing metal oxide and the volume of the conductive material accounts for 40% to 65% of the volume of the positive electrode active material layer;
(4) x and y are within the range $0.015 \leq x \leq 0.095$ and the range $0.025 \leq y \leq 0.19$, respectively; and
(5) x and y have a ratio of 1:1 to 1:2.

BRIEF DESCRIPTION OF DRAWINGS

FIG. 1 is a schematic view of a lithium ion secondary battery of an example.

DESCRIPTION OF EMBODIMENTS

The present invention is described below in detail.
(I) Positive Electrode
A positive electrode includes a collector and a positive electrode active material layer, formed on at least one surface of the collector, containing a lithium-containing metal oxide as a positive electrode active material.

(a) Lithium-Containing Metal Oxide

The lithium-containing metal oxide has a unit cell represented by the following formula:

$$LiFe_{1-x}Zr_xP_{1-y}Si_yO_4 \qquad (1)$$

where $0<x<1$ and $0<y<1$.

The valence of Fe and the valence of Zr are not particularly limited. In particular, Fe can take a valence of 2 to 4 and a valence of 6 and Zr can take a valence of 2 to 4. Fe and Zr can be used as a metal element with a single valence or a mixture of metal elements with several valences. In the case of using such a mixture, the valence for determining x in Formula (1) refers to an average for convenience. From the viewpoint of enhancing the intercalation and deintercalation of Li, Fe is preferably bivalent. From the viewpoint that a change in valence is little during the production of the lithium-containing metal oxide and charge/discharge, Zr is preferably tetravalent.

X can take the range $0<x<1$ and y can take the range $0<y<1$. From the viewpoint of enhancing cycle characteristics, it is preferred that x is within the range $0.015 \leq x \leq 0.095$ and/or y is within the range $0.025 \leq y \leq 0.19$ and it is more preferred that x is within the range $0.025 \leq x \leq 0.05$ and/or y is within the range $0.025 \leq y \leq 0.10$.

Furthermore, from the viewpoint of further enhancing cycle characteristics, x and y preferably have a ratio of 1:1 to 1:2.

Although most of lithium-containing metal oxides having a composition represented by Formula (1) have an olivine structure, the configuration may have no olivine structure.

Next, the unit cell of the lithium-containing metal oxide has lattice constants satisfying $10.326 \leq a \leq 10.335$, $6.006 \leq b \leq 6.012$, and $4.685 \leq c \leq 4.714$. The inventors have unexpectedly found that the possession of the lattice constants within these ranges enables cycle characteristics to be enhanced. The lattice constants more preferably satisfy $10.326 \leq a \leq 10.330$, $6.006 \leq b \leq 6.008$, and $4.685 \leq c \leq 4.694$.

The lithium-containing metal oxide preferably has an average particle size of 0.3 μm to 30 μm and more preferably 3 μm to 18 μm.

(b) Method for Producing Lithium-Containing Metal Oxide

The lithium-containing metal oxide can be produced using a combination of carbonates, hydroxides, chlorides, sulfates, acetates, oxides, oxalates, nitrates, alkoxides, or the like of elements as raw materials. Raw materials may contain water of hydration. The following methods can be used as a production method: methods such as a calcination method, a solid-phase method, a sol-gel method, a melt-quenching method, a mechanochemical method, a co-precipitation method, a hydrothermal method, a spray pyrolysis method, and the like. Among these methods, the calcination method (calcination conditions are 400° C. to 650° C. and 1 to 24 hours) under an inert atmosphere (for example, a nitrogen atmosphere) is convenient.

The lattice constants a, b, and c can be adjusted within the above ranges, for example, as described below. That is, a can be adjusted to an upper limit by increasing the amount of a charged Zr source material (Zr source) and can be adjusted to a lower limit by reducing the amount of the charged Zr source material (Zr source). In addition, b can be adjusted to an upper limit by increasing the amount of the charged Zr source material (Zr source) and can be adjusted to a lower limit by reducing the amount of the charged Zr source material (Zr source). Furthermore, c can be adjusted to an upper limit by increasing the amount of the charged Zr source material (Zr source) and can be adjusted to a lower limit by reducing the amount of the charged Zr source material (Zr source).

(c) Others

In order to increase conductivity, the surface of the lithium-containing metal oxide may be covered by carbon. The lithium-containing metal oxide may be entirely or partly covered by carbon.

A covering method for carbon is not particularly limited and may be a known method. For example, the following method is cited: a method in which a compound serving as a carbon source is mixed with raw materials of the lithium-containing metal oxide and the obtained mixture is calcined in an inert atmosphere so as to be covered. The compound serving as the carbon source needs to be a compound that does not prevent the raw materials from being converted into the lithium-containing metal oxide. Examples of such a compound include sugars such as sucrose and fructose and polyethers such as polyethylene glycol and polypropylene glycol. Furthermore, the following polymers can be used: carbon-containing polymers such as polyvinyl alcohol, polyacrylamide, carboxymethylcellulose, and polyvinyl acetate.

The amount of the compound serving as the carbon source is preferably 5% to 30% by weight of the sum of the amounts of the raw materials of the lithium-containing metal oxide.

(d) Positive Electrode Active Material Layer

The positive electrode active material layer contains the lithium-containing metal oxide as a positive electrode active material and a conductive material.

The positive electrode active material layer has voids with a volume of $0.82 \times 10^{-3}$ cm$^3$/cm$^2$ to $7.87 \times 10^{-3}$ cm$^3$/cm$^2$ per unit area of the collector. When the volume of the voids is less than $0.82 \times 10^{-3}$ cm$^3$/cm$^2$, the migration of lithium is interrupted by precipitates formed by a side reaction of an electrolyte solution in the voids and therefore cycle characteristics may possibly be reduced. When the volume thereof is more than $7.87 \times 10^{-3}$ cm$^3$/cm$^2$, conductive paths are insufficient, rate characteristics are reduced, and battery energy density may possibly be reduced.

The volume of the voids can be adjusted by, for example, a method below. In the case of raising the volume of the voids, the press spacing during pressing is increased. In the case of reducing the volume of the voids, the press spacing during pressing is reduced.

The positive electrode active material layer preferably has voids with a volume fraction of 30% to 52%. When the volume fraction is less than 30%, the migration of lithium is interrupted by precipitates formed by a side reaction of the electrolyte solution in the voids and therefore cycle characteristics may possibly be reduced. When the volume fraction is more than 52%, conductive paths are insufficient, rate characteristics are reduced, and battery energy density may possibly be reduced. The volume fraction is more preferably 34% to 48%.

The positive electrode active material layer preferably has a volume of $2.80 \times 10^{-3}$ cm$^3$/cm$^2$ to $15.8 \times 10^{-3}$ cm$^3$/cm$^2$ per unit area of the collector. When the volume thereof is less than $2.80 \times 10^{-3}$ cm$^3$/cm$^2$, the capacity of an electrode is reduced and therefore in the case of manufacturing a battery with a certain capacity, the number of members, such as collectors and separators, included in the battery is increased. This may possibly lead to an increase in manufacturing cost and a reduction in capacity density. When the volume thereof is more than $15.8 \times 10^{-3}$ cm$^3$/cm$^2$, in the process of applying electrode slurry to the collector, it takes a long time to dry the applied slurry; hence, productivity may possibly be reduced. The volume thereof is more preferably $4.17 \times 10^{-3}$ cm$^3$/cm$^2$ to $13.2 \times 10^{-3}$ cm$^3$/cm$^2$.

The sum of the volume of the lithium-containing metal oxide and the volume of the conductive material is $1.61 \times 10^{-3}$ cm$^3$/cm$^2$ to $6.46 \times 10^{-3}$ cm$^3$/cm$^2$ per unit area of the collector. When the sum thereof is less than $1.61 \times 10^{-3}$ cm$^3$/cm$^2$, the capacity of an electrode is reduced and therefore in the case of manufacturing a battery with a certain capacity, the number of members, such as collectors and separators, included in the battery is increased. This may possibly lead to an increase in manufacturing cost and a reduction in capacity density. When the sum thereof is more than $6.46 \times 10^{-3}$ cm$^3$/cm$^2$, the active material layer is thick, the through-thickness resistance is increased, and rate characteristics may possibly be reduced. The sum thereof is preferably $2.26 \times 10^{-3}$ cm$^3$/cm$^2$ to $4.85 \times 10^{-3}$ cm$^3$/cm$^2$.

The volume of the lithium-containing metal oxide is preferably $1.40 \times 10^{-3}$ cm$^3$/cm$^2$ to $5.80 \times 10^{-3}$ cm$^3$/cm$^2$ per unit area of the collector. When the volume thereof is less than $1.40 \times 10^{-3}$ cm$^3$/cm$^2$, the capacity of an electrode is reduced and therefore in the case of manufacturing a battery with a certain capacity, the number of members, such as collectors and separators, included in the battery is increased. This may possibly lead to an increase in manufacturing cost and a reduction in capacity density. When the volume thereof is more than $5.80 \times 10^{-3}$ cm$^3$/cm$^2$, the conductive material needs to be excessively used to sufficiently form conductive contacts of the lithium-containing metal oxide. The sum is preferably $2.02 \times 10^{-3}$ cm$^3$/cm$^2$ to $4.35 \times 10^{-3}$ cm$^3$/cm$^2$.

The volume of the conductive material is preferably $0.16 \times 10^{-3}$ cm$^3$/cm$^2$ to $0.67 \times 10^{-3}$ cm$^3$/cm$^2$ per unit area of the collector. When the volume thereof is less than $0.16 \times 10^{-3}$ cm$^3$/cm$^2$, conductive contacts of the lithium-containing metal oxide are insufficient, the resistance of the active material layer is increased, and rate characteristics may possibly be reduced. When the volume thereof is more than $0.67 \times 10^{-3}$ cm$^3$/cm$^2$, the number of particles of the conductive material in the active material layer is increased and therefore a binder may possibly need to be excessively used to obtain contacts between the particles. The sum is more preferably $0.23 \times 10^{-3}$ cm$^3$/cm$^2$ to $0.50 \times 10^{-3}$ cm$^3$/cm$^2$.

The ratio of the volume of the lithium-containing metal oxide to the volume of the conductive material is preferably 1:0.06 to 1:0.23. When the volume ratio of the conductive material is less than 0.06, conductive contacts of the lithium-containing metal oxide are insufficient, the resistance of the active material layer is increased, and rate characteristics may possibly be reduced. When the volume ratio thereof is more than 0.23, the number of the conductive material particles in the active material layer is increased and therefore the binder may possibly need to be excessively used to obtain contacts between the particles. The ratio is more preferably 1:0.08 to 1:0.16.

The sum of the volume of the lithium-containing metal oxide and the volume of the conductive material preferably accounts for 40% to 65% of the volume of the positive electrode active material layer. When the sum thereof is less than 40%, the number of conductive contacts between particles in the active material layer is reduced, conductive paths are insufficient, rate characteristics are reduced, and battery energy density may possibly be reduced. When the sum thereof is more than 65%, the voids of the active material layer are small, the migration of lithium is interrupted by precipitates formed by a side reaction of the electrolyte solution in the voids, and therefore cycle characteristics may possibly be reduced. The sum thereof is more preferably 46% to 55%.

Incidentally, the above volume is a value calculated from the average particle size of each of the lithium-containing metal oxide and conductive material in the positive electrode active material layer. A calculation method is described in EXAMPLES.

The positive electrode active material layer can be prepared by a known method or in such a manner that, for example, slurry prepared by mixing the lithium-containing metal oxide, the conductive material, and the binder with an organic solvent is applied to the collector.

The conductive material used may be acetylene black, carbon, graphite, natural graphite, synthetic graphite, needle coke, or the like.

The binder (binding agent) used may be a (meth)acrylic resin, polytetrafluoroethylene, polyvinylidene fluoride, polyvinyl chloride, an ethylene-propylene-diene polymer, styrene-butadiene rubber, acrylonitrile-butadiene rubber, fluoro-rubber, polyvinyl acetate, polyethylene, nitrocellulose, or the like.

A thickening agent used may be carboxymethylcellulose, polyvinyl alcohol, polyvinylpyrrolidone, or the like.

The organic solvent used may be N-methyl-2-pyrrolidone, toluene, cyclohexane, dimethylformamide, dimethylacetamide, methyl ethyl ketone, methyl acetate, methyl acrylate, diethyltriamine, N,N-dimethylaminopropylamine, ethylene oxide, tetrahydrofuran, or the like.

The collector used can be made from a foam (porous) metal having open cells, a honeycombed metal, a sintered metal, an expanded metal, nonwoven fabric, a plate, foil, a punched plate, punched foil, or the like.

The thickness of the positive electrode active material is preferably about 0.01 mm to 2 mm. When the thickness thereof is excessively large, the conductivity is reduced, which is not preferred. When the thickness thereof is excessively small, the capacity per unit area is reduced, which is not preferred. In order to increase the packing density of the lithium-containing metal oxide, the positive electrode active material layer obtained by application and drying may be compressed by pressing or the like.

(II) Lithium Ion Secondary Battery

A lithium ion secondary battery according to the present invention includes the positive electrode, a negative electrode, and a separator located between the positive electrode and the negative electrode.

(a) Negative Electrode

The negative electrode includes a negative electrode active material layer.

The negative electrode active material layer can be prepared by a known method. In particular, the negative electrode active material layer can be prepared by a method similar to the method used to prepare the positive electrode active material layer. That is, after the binder, conductive material, and thickening agent used to prepare the positive electrode active material layer are mixed with a negative electrode active material, the mixed powder is formed into a sheet and the formed sheet may be press-bonded to a conductive net (collector) made of stainless steel or copper. Alternatively, the negative electrode active material layer can be prepared in such a manner that slurry obtained by mixing the mixed powder with the known organic solvent used to prepare the positive electrode active material layer is applied to a collector made of copper or the like.

The positive electrode active material used may be a known material. In order to make a high-energy density battery, a material with a lithium intercalation-deintercalation potential close to the deposition-dissolution potential of metallic lithium is preferred. A typical example of such a material is a carbon material such as granular (scaly, massive, fibrous, whisker-shaped, spherical, or particulate) synthetic or natural graphite.

Graphite obtained by graphitizing meso-carbon microbeads, a mesophase pitch powder, an isotropic pitch powder, or the like is cited as synthetic graphite. Graphite particles coated with amorphous carbon can also be used. Among these materials, natural graphite is preferred because natural graphite is inexpensive, has a potential close to the oxidation-reduction potential of lithium, and can be used to make a high-energy density battery.

The negative electrode active material used may be a lithium transition metal oxide, a lithium transition metal nitride, a transition metal oxide, silicon oxide, or the like. In particular, $Li_4Ti_5O_{12}$ is preferred because the flatness of the potential of $Li_4Ti_5O_{12}$ is high and $Li_4Ti_5O_{12}$ has a small change in volume due to charge or discharge.

(b) Nonaqueous Electrolyte

The lithium ion secondary battery usually includes a nonaqueous electrolyte between the positive electrode and the negative electrode. The nonaqueous electrolyte used may be, for example, an organic electrolyte solution, a gelled electrolyte, a polymeric solid electrolyte, an inorganic solid electrolyte, a molten salt, or the like. In particular, the organic electrolyte solution is generally used from the viewpoint of the ease of manufacturing a battery.

The organic electrolyte solution contains an electrolyte salt and an organic solvent.

Examples of the organic solvent include cyclic carbonates such as propylene carbonate (PC), ethylene carbonate (EC), and butylene carbonate; linear carbonates such as dimethyl carbonate (DMC), diethyl carbonate (DEC), ethyl methyl carbonate, and dipropyl carbonate; lactones such as γ-butyrolactone (GBL) and γ-valerolactone; furans such as tetrahydrofuran and 2-methyltetrahydrofuran; ethers such as diethyl ether, 1,2-dimethoxyethane, 1,2-diethoxyethane, ethoxymethoxyethane, and dioxane; dimethyl sulfoxide; sulfolane; methylsulfolane; acrylonitrile; methyl formate; and methyl acetate. These compounds can be used alone or in combination.

The cyclic carbonates, such as PC, EC, and butylene carbonate, have a high boiling point and therefore are preferred as a solvent mixed with GBL.

Examples of the electrolyte salt include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$), and lithium bis(trifluoromethanesulfonyl)imide($LiN(CF_3SO_2)_2$). These salts can be used alone or in combination. The concentration of the salt in the electrolyte solution is preferably 0.5 mol/l to 3 mol/l.

(c) Separator

The separator is made of a porous material, nonwoven fabric, or the like. A material for the separator is preferably one that is not dissolved in or swollen with the organic solvent contained in the electrolyte. Examples of such a material include polyester polymers, polyolefin polymers (for example, polyethylene and polypropylene), ether polymers, inorganic materials such as glass.

(d) Other Members

Other members such as a battery case are not particularly limited and may be made of various materials for use in conventionally known lithium ion secondary batteries.

(e) Method for Manufacturing Lithium Ion Secondary Battery

The lithium ion secondary battery includes, for example, a stack including the positive electrode, the negative electrode, and the separator therebetween. The stack may have, for example, a strip shape in plan view. In the case of manufacturing a cylindrical or flat battery, the stack may be wound.

The stack or a plurality of stacks are inserted in a battery case. In usual, the positive and negative electrodes are connected to external conductive terminals of a battery. Thereafter, the battery case is sealed for the purpose of isolating the positive electrode, the negative electrode, and the separator from air.

In the case of a cylindrical battery, a sealing method is usually as follows: a lid with a gasket made of resin is fitted into an opening of the battery case and the battery case and the lid are swaged. In the case of a rectangular battery, the following method can be used: a method in which a metal lid called a sealing plate is attached to an opening and is welded. In addition to these methods, a sealing method using a binding agent and a method in which a gasket is bolted can be used.

Furthermore, a sealing method using a laminated film prepared by applying a thermoplastic resin to metal foil can be used.

Incidentally, an opening for introducing an electrolyte may be provided during sealing.

EXAMPLES

The present invention is further described below in detail with reference to examples. The present invention is not limited to the examples. Reagents and the like used in the examples are special-grade chemicals produced by Kishida Chemical Co., Ltd. unless otherwise specified.

(Synthesis of Positive Electrode Active Material)

(1) Positive Electrode Active Material A1

Starting materials used were $LiCH_3COO$ which was a lithium source, $Fe(NO_3)_3 \cdot 9H_2O$ which was an iron source, $ZrCl_4$ which was a zirconium source, $H_3PO_4$ which was a phosphorus source, and $Si(OC_2H_5)_4$ which was a silicon source. The above materials were weighed such that the amount of $LiCH_3COO$, which was the lithium source, was 131.96 g and the molar ratio of Li to Fe to Zr to P to Si was 1:0.95:0.05:0.95:0.05. These were dissolved in 3 L of $C_2H_5OH$ (solvent) and the solution was stirred with a stirrer at room temperature for 48 hours. Thereafter, the solvent was removed from the solution in a 40° C. thermostatic chamber, whereby a dark brown powder was obtained.

To the obtained powder, 15% by weight of an aqueous solution of sucrose was added, followed by mixing in an agate mortar. The mixture was press-molded into pellets. The pellets were calcined at 500° C. for 12 hours in a nitrogen atmosphere, whereby a positive electrode active material A1 having an average particle size of 9.2 μm and a true density of 3.45 g/cm³ was synthesized in the form of a single-phase powder. The obtained positive electrode active material A1 had lattice constants (a, b, c) of (10.328, 6.008, 4.694).

The average particle size of a single-phase powder refers to a D50 value at which the cumulative volume of particles reaches 50% and is a value determined using a laser diffraction/scattering particle size distribution analyzer.

The lattice constants were determined by a procedure below.

The positive electrode active material A1 was crushed in an agate mortar and was analyzed with an X-ray diffractometer, MiniFlex II, manufactured by Rigaku Corporation, whereby a powder X-ray diffraction pattern was obtained. Measurement conditions were set to a voltage of 30 kV, a current of 15 mA, a divergence slit of 1.25°, a receiving slit of 0.3 mm, a scattering slit of 1.25°, a 2θ range of 10° to 90°, and 0.02° per step. The measurement time per step was adjusted such that the maximum peak intensity was 800 to 1,500. Next, the obtained powder X-ray diffraction pattern was subjected to structural analysis by Rietveld analysis using "DD3. bat" in such a manner that an "ins" file was created using "RIETAN-FP" (F. Izumi and K. Momma, "Three-dimensional visualization in powder diffraction", Solid State Phenom., 130, 15-20 (2007)) and parameters shown in Table 1 as initial values. Parameters were read from a ". 1st" file, whereby the lattice constants were determined (an S value (the degree of convergence) was 1.1 to 1.3).

TABLE 1

| Space group Pnma | | | | | |
|---|---|---|---|---|---|
| Lattice constants | | | | | |
| a | | b | | c | |
| 10.3270 | | 6.0060 | | 4.6966 | |
| Element | Site name | Occupancy | x | y | z |
| Li | 4a | 1.000 | 0.000 | 0.000 | 0.000 |
| Fe | 4a | 0.000 | 0.000 | 0.000 | 0.000 |
| Zr | 4a | 0.000 | 0.000 | 0.000 | 0.000 |
| Fe | 4c | * | 0.282 | 0.250 | 0.974 |
| Zr | 4c | * | 0.282 | 0.250 | 0.974 |
| P | 4c | * | 0.095 | 0.250 | 0.419 |
| Si | 4c | * | 0.095 | 0.250 | 0.419 |
| O | 4c | 1.000 | 0.097 | 0.250 | 0.741 |
| O | 4c | 1.000 | 0.453 | 0.250 | 0.213 |
| O | 8d | 1.000 | 0.165 | 0.045 | 0.282 |

In Table 1, * refers to allocating depending on the charge ratio. The positive electrode active material A1 takes values of 0.995, 0.005, 0.995, and 0.005 from the top.

(2) Positive Electrode Active Material A2

A positive electrode active material A1 (an average particle size of 9.2 μm and a true density of 3.45 g/cm$^3$) was obtained in substantially the same manner as that used to obtain the positive electrode active material A1 except that raw materials were weighed such that the molar ratio of Li to Fe to Zr to P to Si was 1:0.975:0.025:0.975:0.025. The obtained positive electrode active material A2 had lattice constants (a, b, c) of (10.330, 6.008, 4.694).

(3) Positive Electrode Active Material A3

A positive electrode active material A1 (an average particle size of 9.2 μm and a true density of 3.45 g/cm$^3$) was obtained in substantially the same manner as that used to obtain the positive electrode active material A1 except that raw materials were weighed such that the molar ratio of Li to Fe to Zr to P to Si was 1:0.975:0.025:0.95:0.05. The obtained positive electrode active material A3 had lattice constants (a, b, c) of (10.327, 6.007, 4.693).

(4) Positive Electrode Active Material A4

A positive electrode active material A1 (an average particle size of 9.2 μm and a true density of 3.45 g/cm$^3$) was obtained in substantially the same manner as that used to obtain the positive electrode active material A1 except that raw materials were weighed such that the molar ratio of Li to Fe to Zr to P to Si was 1:0.965:0.035:0.965:0.035. The obtained positive electrode active material A1 had lattice constants (a, b, c) of (10.326, 6.007, 4.693).

(5) Positive Electrode Active Material A5

A positive electrode active material A1 (an average particle size of 9.2 μm and a true density of 3.45 g/cm$^3$) was obtained in substantially the same manner as that used to obtain the positive electrode active material A1 except that raw materials were weighed such that the molar ratio of Li to Fe to Zr to P to Si was 1:0.905:0.095:0.81:0.19. The obtained positive electrode active material A5 had lattice constants (a, b, c) of (10.335, 6.012, 4.714).

(6) Positive Electrode Active Material A6

A positive electrode active material A1 (an average particle size of 9.2 μm and a true density of 3.45 g/cm$^3$) was obtained in substantially the same manner as that used to obtain the positive electrode active material A1 except that raw materials were weighed such that the molar ratio of Li to Fe to Zr to P to Si was 1:0.985:0.015:0.97:0.03. The obtained positive electrode active material A6 had lattice constants (a, b, c) of (10.326, 6.006, 4.685).

(7) Positive Electrode Active Material A7

A positive electrode active material A1 (an average particle size of 9.2 μm and a true density of 3.45 g/cm$^3$) was commercially available LiFePO$_4$ (produced by Sumitomo Osaka Cement Co., Ltd.). The positive electrode active material A7 had lattice constants (a, b, c) of (10.325, 6.004, 4.683).

(8) Positive Electrode Active Material A8

A positive electrode active material A1 (an average particle size of 9.2 μm and a true density of 3.45 g/cm$^3$) was obtained in substantially the same manner as that used to obtain the positive electrode active material A1 except that raw materials were weighed such that the molar ratio of Li to Fe to Zr to P to Si was 1:0.9:0.1:0.8:0.2. The obtained positive electrode active material A5 had lattice constants (a, b, c) of (10.337, 6.015, 4.720).

(9) Positive Electrode Active Material A9

A positive electrode active material A9 (an average particle size of 9.2 μm and a true density of 3.45 g/cm$^3$) was obtained in substantially the same manner as that used to obtain the positive electrode active material A1 except that raw materials were weighed such that the molar ratio of Li to Fe to Zr to P to Si was 1:0.925:0.075:0.85:0.15. The obtained positive electrode active material A2 had lattice constants (a, b, c) of (10.338, 6.005, 4.691).

The raw material Zr/Si molar ratio, lattice constants, true density, and average particle size of each positive electrode active material are summarized in Table 2.

TABLE 2

| | | Raw material Zr/Si molar ratio | Lattice constants | | | True density g/cm$^3$ | Average particle size D50 μm |
|---|---|---|---|---|---|---|---|
| | | | a | b | c | | |
| Positive electrode active material | A1 | 0.05/0.05 | 10.328 | 6.008 | 4.694 | 3.45 | 9.2 |
| | A2 | 0.025/0.025 | 10.330 | 6.008 | 4.694 | 3.45 | 9.2 |
| | A3 | 0.025/0.05 | 10.327 | 6.007 | 4.693 | 3.45 | 9.2 |
| | A4 | 0.035/0.035 | 10.326 | 6.007 | 4.693 | 3.45 | 9.2 |
| | A5 | 0.095/0.19 | 10.335 | 6.012 | 4.714 | 3.45 | 9.2 |
| | A6 | 0.015/0.03 | 10.326 | 6.006 | 4.685 | 3.45 | 9.2 |

TABLE 2-continued

| | Raw material Zr/Si molar ratio | Lattice constants | | | True density g/cm³ | Average particle size D50 μm |
|---|---|---|---|---|---|---|
| | | a | b | c | | |
| A7 | — | 10.325 | 6.004 | 4.683 | 3.45 | 9.2 |
| A8 | 0.1/0.2 | 10.337 | 6.015 | 4.720 | 3.45 | 9.2 |
| A9 | 0.075/0.15 | 10.338 | 6.005 | 4.691 | 3.45 | 9.2 |

Example 1

(1) Positive Electrode

The positive electrode active material A1, acetylene black (a conductive material, an average particle size of 0.035 μm, a true density of 1.8 g/cm³, produced by Denki Kagaku Kogyo Kabushiki Kaisha), an acrylic resin (a binder, a solid concentration of 29.9% by weight, produced by JSR Corporation), and carboxymethylcellulose (a thickening agent, produced by Dai-ichi Kogyo Seiyaku Co., Ltd.) were mixed at a weight (g) ratio of 100:6:27:1.2 and were mixed with 78.8 g of ion-exchanged water at room temperature using FILMIX 80-50 (manufactured by PRIMIX Corporation), whereby aqueous positive electrode paste was obtained. The aqueous positive electrode paste was applied to both surfaces of rolled aluminium foil (a thickness of 20 μm) using a die coater. The quantity of application (solid) of the positive electrode active material, that of acetylene black, that of the acrylic resin, and that of carboxymethylcellulose were 5 mg/cm², 0.30 mg/cm², 0.35 mg/cm², and 0.003 mg/cm², respectively. Obtained wet coatings were dried at 100° C. for 10 minutes in air (a dry thickness of 68 μm), followed by pressing, whereby a positive electrode P1 (a coated surface size of 28 mm (length)×28 mm (width)) including a collector and positive electrode active material layers, placed on the collector, having a thickness of 48 μm was obtained.

The sum of the volume of the positive electrode active material and the volume of the conductive material was $1.62 \times 10^{-3}$ cm³/cm². The volume of voids in the positive electrode active material layers was $0.84 \times 10^{-3}$ cm³/cm².

Incidentally, each volume was determined by a procedure below.

(i) The volume of the positive electrode active material refers to the product of the average particle size thereof and the number of particles of the positive electrode active material per unit area of the collector.

(ii) The volume of the conductive material refers to the product of the average particle size thereof and the number of particles of the positive electrode active material per unit area of the collector. The average particle size of the conductive material refers to a value obtained by a method similar to that for the positive electrode active material.

(iii) The volume of the voids in the positive electrode active material layers refers to a value obtained by subtracting the volumes of the positive electrode active material and the conductive material, which are solids making up the positive electrode active material layers, from the volume of the positive electrode active material layers. The volume of each positive electrode active material layer refers to the product of the thickness, length, and width of the positive electrode active material layer.

(2) Negative Electrode

Natural graphite (produced by Hitachi Chemical Co., Ltd.), styrene-butadiene rubber (a binder, a solid concentration of 40.1% by weight, produced by ZEON Corporation), and carboxymethylcellulose (a thickening agent, produced by Daicel Corporation) were mixed at a weight (g) ratio of 100:2:1 and were mixed with 100 g of ion-exchanged water at room temperature using a twin-screw planetary mixer (manufactured by PRIMIX Corporation), whereby aqueous negative electrode paste was obtained. The aqueous negative electrode paste was applied to a surface of rolled copper foil (a thickness of 10 μm) using a die coater. An obtained wet coating was dried at 100° C. for 10 minutes in air, followed by pressing, whereby a negative electrode (a coated surface size of 30 mm (length)×30 mm (width)) including a collector and a negative electrode active material layer, placed on the collector, having a thickness of 20 μm was obtained.

(3) Battery

A battery shown in FIG. 1(b) was prepared by a procedure shown in FIG. 1(a).

After being vacuum-dried at 130° C. for 24 hours, the positive electrode 1 and the negative electrode 2 were put in a glove box under a dry Ar atmosphere. Next, a tab lead 4, made of aluminium, equipped with an adhesive film 3 and a tab lead 6, made of nickel, equipped with an adhesive film 5 were ultrasonically welded to the positive electrode 1 and the negative electrode 2, respectively. In the glove box, a separator 9 (a microporous membrane, a size of 30 mm (length)×30 mm (width)×25 μm (thickness), manufactured by Polypore K.K.) was stacked on the negative electrode 2 so as to cover a coated surface 7 of the negative electrode 2 and the positive electrode 1 was stacked on the separator 9 such that a coated surface was centered, whereby a unit cell 10 was prepared. Reference numeral 8 represents coated surfaces of the positive electrode 1.

Furthermore, the unit cell 11 was interposed between aluminium-laminated films 11 and 12. Three sides of the aluminium-laminated films 11 and 12 were heat-welded such that the adhesive films 3 and 5 of the tab leads 4 and 6 were interposed. An electrolyte solution was prepared in such a manner that 1 mol/L of $LiPF_6$ was dissolved in a solvent prepared by mixing ethylene carbonate (EC) and diethyl carbonate (DEC) at a volume ratio of 1:2. The electrolyte solution was poured into the unit cell 10 through an unwelded side. After the electrolyte solution was poured, the last side of a bag composed of the aluminium-laminated films 11 and 12 was heat-welded at a reduced pressure of 10 kPa, whereby a battery 14 was obtained. Reference numeral 13 represents a heat-welded portion.

The amount of the poured electrolyte solution was appropriately determined depending on the thicknesses of electrodes (the sum of thicknesses of a positive electrode and a negative electrode) used in each battery and was adjusted such that the electrolyte solution sufficiently permeated a positive electrode, negative electrode, and separator of an actually prepared battery.

Example 2

A battery was obtained in substantially the same manner as that described in Example 1 except that the positive electrode active material A2 was used and the volume of voids in a positive electrode active material layer was $1.56 \times 10^{-3}$ cm³/cm².

Example 3

A battery was obtained in substantially the same manner as that described in Example 1 except that the positive electrode active material A3 was used and the volume of voids in a positive electrode active material layer was $1.76 \times 10^{-3}$ cm$^3$/cm$^2$.

Example 4

A battery was obtained in substantially the same manner as that described in Example 1 except that the positive electrode active material A4 was used; the quantity of application (solid) of the positive electrode active material, that of acetylene black, that of the acrylic resin, and that of carboxymethylcellulose were 8 mg/cm$^2$, 0.48 mg/cm$^2$, 0.56 mg/cm$^2$, and 0.005 mg/cm$^2$, respectively; and the volume of voids in a positive electrode active material layer was $2.86 \times 10^{-3}$ cm$^3$/cm$^2$.

Example 5

A battery was obtained in substantially the same manner as that described in Example 1 except that the positive electrode active material A5 was used; the quantity of application (solid) of the positive electrode active material, that of acetylene black, that of the acrylic resin, and that of carboxymethylcellulose were 8 mg/cm$^2$, 0.48 mg/cm$^2$, 0.56 mg/cm$^2$, and 0.005 mg/cm$^2$, respectively; and the volume of voids in a positive electrode active material layer was $2.86 \times 10^{-3}$ cm$^3$/cm$^2$.

Example 6

A battery was obtained in substantially the same manner as that described in Example 1 except that the quantity of application (solid) of the positive electrode active material, that of acetylene black, that of the acrylic resin, and that of carboxymethylcellulose were 14.2 mg/cm$^2$, 0.85 mg/cm$^2$, 0.99 mg/cm$^2$, and 0.009 mg/cm$^2$, respectively and the volume of voids in a positive electrode active material layer was $5.07 \times 10^{-3}$ cm$^3$/cm$^2$.

Example 7

A battery was obtained in substantially the same manner as that described in Example 1 except that the positive electrode active material A6 was used; the quantity of application (solid) of the positive electrode active material, that of acetylene black, that of the acrylic resin, and that of carboxymethylcellulose were 12 mg/cm$^2$, 0.72 mg/cm$^2$, 0.83 mg/cm$^2$, and 0.008 mg/cm$^2$, respectively; and the volume of voids in a positive electrode active material layer was $4.57 \times 10^{-3}$ cm$^3$/cm$^2$.

Example 8

A battery was obtained in substantially the same manner as that described in Example 1 except that the quantity of application (solid) of the positive electrode active material, that of acetylene black, that of the acrylic resin, and that of carboxymethylcellulose were 18.4 mg/cm$^2$, 1.10 mg/cm$^2$, 1.28 mg/cm$^2$, and 0.012 mg/cm$^2$, respectively and the volume of voids in a positive electrode active material layer was $7.84 \times 10^{-3}$ cm$^3$/cm$^2$.

Example 9

A battery was obtained in substantially the same manner as that described in Example 1 except that the quantity of application (solid) of the positive electrode active material, that of acetylene black, that of the acrylic resin, and that of carboxymethylcellulose were 19.8 mg/cm$^2$, 1.19 mg/cm$^2$, 1.38 mg/cm$^2$, and 0.012 mg/cm$^2$, respectively and the volume of voids in a positive electrode active material layer was $7.22 \times 10^{-3}$ cm$^3$/cm$^2$.

Comparative Example 1

A battery was obtained in substantially the same manner as that described in Example 1 except that the volume of voids in a positive electrode active material layer was $0.66 \times 10^{-3}$ cm$^3$/cm$^2$.

Comparative Example 2

A battery was obtained in substantially the same manner as that described in Example 1 except that the quantity of application (solid) of the positive electrode active material, that of acetylene black, that of the acrylic resin, and that of carboxymethylcellulose were 18.4 mg/cm$^2$, 1.10 mg/cm$^2$, 1.28 mg/cm$^2$, and 0.012 mg/cm$^2$, respectively and the volume of voids in a positive electrode active material layer was $7.97 \times 10^{-3}$ cm$^3$/cm$^2$.

Comparative Example 3

A battery was obtained in substantially the same manner as that described in Example 1 except that the quantity of application (solid) of the positive electrode active material, that of acetylene black, that of the acrylic resin, and that of carboxymethylcellulose were 21 mg/cm$^2$, 1.26 mg/cm$^2$, 1.46 mg/cm$^2$, and 0.13 mg/cm$^2$, respectively and the volume of voids in a positive electrode active material layer was $7.03 \times 10^{-3}$ cm$^3$/cm$^2$.

Comparative Example 4

A battery was obtained in substantially the same manner as that described in Example 1 except that the positive electrode active material A7 was used; the quantity of application (solid) of the positive electrode active material, that of acetylene black, that of the acrylic resin, and that of carboxymethylcellulose were 8.0 mg/cm$^2$, 0.48 mg/cm$^2$, 0.56 mg/cm$^2$, and 0.005 mg/cm$^2$, respectively; and the volume of voids in a positive electrode active material layer was $2.86 \times 10^{-3}$ cm$^3$/cm$^2$.

Comparative Example 5

A battery was obtained in substantially the same manner as that described in Example 1 except that the positive electrode active material A8 was used; the quantity of application (solid) of the positive electrode active material, that of acetylene black, that of the acrylic resin, and that of carboxymethylcellulose were 8.0 mg/cm$^2$, 0.48 mg/cm$^2$, 0.55 mg/cm$^2$, and 0.005 mg/cm$^2$, respectively; and the volume of voids in a positive electrode active material layer was $2.85 \times 10^{-3}$ cm$^3$/cm$^2$.

Comparative Example 6

A battery was obtained in substantially the same manner as that described in Example 1 except that the positive electrode active material A9 was used; the quantity of application (solid) of the positive electrode active material, that of acetylene black, that of the acrylic resin, and that of carboxymethylcellulose were 12.0 mg/cm$^2$, 0.72 mg/cm$^2$, 0.83 mg/cm², and 0.008 mg/cm², respectively; and the volume of voids in a positive electrode active material layer was $4.57 \times 10^{-3}$ cm³/cm².

(Evaluation of Batteries)

(1) Rate Characteristic

In a 25° C. environment, each prepared battery was charged to 3.6 V at 0.1 C and was discharged to 2.0 V at 0.1 C and 0.1 C capacity was charged to 3.6 V at 0.1 C and was discharged to 2.0 V at 1 C, whereby 1 C capacity was measured, followed by calculating the rate characteristic (1 C/0.1 C). Incidentally, the current flowing when the capacity calculated from the theoretical capacity of a positive electrode is charged or discharged in 1 hour was defined as 1 C.

(2) Cycle Characteristic

The process of charging each prepared battery to 3.6 V at 1 C and discharging the battery to 2.0 V at 1 C in a 25° C. environment was defined as one cycle, 3,500 cycles were repeated, and the discharge capacity of the 3500th cycle was compared to the discharge capacity of the first cycle, whereby the discharge capacity of the 3500th cycle was calculated.

Obtained results are shown in Table 3.

TABLE 3

| | | Volume ($\times 10^{-3}$ cm³/cm²) | | | | | Cycle characteristic |
|---|---|---|---|---|---|---|---|
| | | Positive electrode active material/type | Conductive material | Sum | Positive electrode active material layer | Voids | Rate characteristic 1 C/0.1 C (%) | 3500th cycle/ 1st cycle (%) |
| Examples | 1 | 1.45/A1 | 0.17 | 1.62 | 2.81 | 0.84 | 93.3 | 90.3 |
| | 2 | 1.45/A2 | 0.17 | 1.62 | 3.53 | 1.56 | 95.3 | 94.5 |
| | 3 | 1.52/A3 | 0.18 | 1.70 | 3.83 | 1.76 | 92.1 | 90.3 |
| | 4 | 2.32/A4 | 0.27 | 2.59 | 6.00 | 2.86 | 95.8 | 94.8 |
| | 5 | 2.32/A5 | 0.27 | 2.59 | 6.00 | 2.86 | 90.3 | 95.2 |
| | 6 | 4.12/A1 | 0.47 | 4.59 | 10.7 | 5.07 | 93.4 | 90.7 |
| | 7 | 3.48/A6 | 0.40 | 3.88 | 9.29 | 4.57 | 90.8 | 91.4 |
| | 8 | 5.33/A1 | 0.61 | 5.95 | 15.1 | 7.84 | 90.7 | 90.2 |
| | 9 | 5.74/A1 | 0.66 | 6.40 | 15.0 | 7.22 | 90.2 | 90.3 |
| Comparative Examples | 1 | 1.45/A1 | 0.17 | 1.62 | 2.62 | 0.66 | 90.1 | 82.4 |
| | 2 | 5.33/A1 | 0.61 | 5.95 | 15.2 | 7.97 | 86.2 | 88.0 |
| | 3 | 6.09/A1 | 0.70 | 6.79 | 15.3 | 7.03 | 89.2 | 88.3 |
| | 4 | 2.32/A7 | 0.27 | 2.59 | 6.00 | 2.86 | 97.2 | 87.6 |
| | 5 | 2.32/A8 | 0.27 | 2.58 | 6.00 | 2.85 | 74.3 | 89.2 |
| | 6 | 3.48/A9 | 0.40 | 3.88 | 9.29 | 4.57 | 92.3 | 87.6 |

It is clear from Table 3 that when the volume of voids is $0.82 \times 10^{-3}$ cm³/cm² to $7.87 \times 10^{-3}$ cm³/cm²; lattice constants satisfy $10.326 \leq a \leq 10.335$, $6.006 \leq b \leq 6.012$, and $4.685 \leq c \leq 4.714$; and the sum of the volume of a positive electrode active material and the volume of the conductive material is $1.61 \times 10^{-3}$ cm³/cm² to $6.46 \times 10^{-3}$ cm³/cm², the rate characteristic and the cycle characteristic are enhanced.

REFERENCE SIGNS LIST

1 Positive electrode
2 Negative electrode
3 and 5 Adhesive films
4 and 6 Tab leads
7 and 8 Coated surfaces
9 Separator
10 Unit cell
11 and 12 Aluminium-laminated films
13 Heat-welded portion
14 Battery

The invention claimed is:

1. A positive electrode for lithium ion secondary batteries, comprising a collector and a positive electrode active material layer formed on at least one surface of the collector, wherein the positive electrode active material layer contains a lithium-containing metal oxide having a unit cell represented by the following formula and a conductive material and has voids with a volume of $0.82 \times 10^{-3}$ cm³/cm² to $7.87 \times 10^{-3}$ cm³/cm² per unit area of the collector; the unit cell has lattice constants satisfying $10.326 \leq a \leq 10.335$, $6.006 \leq b \leq 6.012$, and $4.685 \leq c \leq 4.714$; the sum of the volume of the lithium-containing metal oxide and the volume of the conductive material is $1.61 \times 10^{-3}$ cm³/cm² to $6.46 \times 10^{-3}$ cm³/cm² per unit area of the collector:

$$LiFe_{1-x}Zr_xP_{1-y}Si_yO_4 \quad (1)$$

where $0 < x < 1$ and $0 < y < 1$.

2. The positive electrode for lithium ion secondary batteries according to claim 1, wherein the volume of the lithium-containing metal oxide is $1.40 \times 10^{-3}$ cm³/cm² to $5.80 \times 10^{-3}$ cm³/cm² per unit area of the collector.

3. The positive electrode for lithium ion secondary batteries according to claim 1, wherein the volume of the conductive material is $0.16 \times 10^{-3}$ cm³/cm² to $0.67 \times 10^{-3}$ cm³/cm² per unit area of the collector.

4. The positive electrode for lithium ion secondary batteries according to claim 1, wherein the volume of the lithium-containing metal oxide and the volume of the conductive material have a ratio of 1:0.06 to 1:0.23.

5. The positive electrode for lithium ion secondary batteries according to claim 1, wherein the sum of the volume of the lithium-containing metal oxide and the volume of the conductive material accounts for 40% to 65% of the volume of the positive electrode active material layer.

6. The positive electrode for lithium ion secondary batteries according to claim 1, wherein x and y are within the range $0.015 \leq x \leq 0.095$ and the range $0.025 \leq y \leq 0.19$, respectively.

7. The positive electrode for lithium ion secondary batteries according to claim 1, wherein x and y have a ratio of 1:1 to 1:2.

8. The positive electrode for lithium ion secondary batteries according to claim 6, wherein the positive electrode active material layer further contains a binder and a thickening agent; the binder is an acrylic resin; the thickening agent is carboxymethylcellulose; the conductive material is acetylene black; and the volume of the positive electrode active material, the volume of the acetylene black, the volume of the acrylic resin, and the volume of the carboxymethylcellulose are 5 mg/cm$^2$ to 19.8 mg/cm$^2$, 0.3 mg/cm$^2$ to 1.19 mg/cm$^2$, 0.35 mg/cm$^2$ to 1.38 mg/cm$^2$, and 0.003 mg/cm$^2$ to 0.012 mg/cm$^2$, respectively, per unit area of the collector.

9. A lithium ion secondary battery comprising the positive electrode according to claim 1, a negative electrode, and a separator located between the positive electrode and the negative electrode.

* * * * *